United States Patent [19]
Ruckdashel

[11] Patent Number: 6,038,542
[45] Date of Patent: Mar. 14, 2000

[54] SYSTEM FOR NOTIFYING AN INDIVIDUAL OF A PREVIOUSLY SCHEDULED EVENT

[75] Inventor: Glenn A. Ruckdashel, Boise, Id.

[73] Assignee: Micron Electronics, Inc., Nampa, Id.

[21] Appl. No.: 09/067,451

[22] Filed: Apr. 28, 1998

[51] Int. Cl.[7] .................................................. G06F 17/60
[52] U.S. Cl. ............................ 705/9; 705/1; 705/7; 705/8
[58] Field of Search .................... 705/1, 7, 8, 9; 364/705.07, 705.08; 707/107

[56] References Cited

U.S. PATENT DOCUMENTS

| | | |
|---|---|---|
| 4,715,010 | 12/1987 | Inoue et al. . |
| 4,774,697 | 9/1988 | Aihara . |
| 4,872,005 | 10/1989 | DeLuca et al. . |
| 5,043,721 | 8/1991 | May . |
| 5,128,981 | 7/1992 | Tsukamoto et al. . |
| 5,220,540 | 6/1993 | Nishida et al. . |
| 5,317,699 | 5/1994 | Sugita et al. . |
| 5,497,141 | 3/1996 | Coles et al. . |
| 5,499,020 | 3/1996 | Motohashi et al. . |
| 5,499,291 | 3/1996 | Kepley ........................................ 379/265 |
| 5,528,667 | 6/1996 | Steffensen et al. . |
| 5,530,861 | 6/1996 | Diamant et al. . |
| 5,548,506 | 8/1996 | Srinivasan . |
| 5,623,242 | 4/1997 | Dawson, Jr. et al. . |
| 5,692,125 | 11/1997 | Schloss et al. ................................ 705/8 |
| 5,842,177 | 11/1998 | Haynes et al. ................................ 705/8 |
| 5,855,006 | 12/1998 | Huemoeller et al. ........................ 705/9 |
| 5,870,713 | 2/1999 | Haneda et al. ................................ 705/9 |
| 5,872,926 | 2/1999 | Levac et al. . |
| 5,893,073 | 4/1999 | Kasso et al. ................................ 705/8 |
| 5,895,451 | 4/1999 | Yamade et al. ............................. 705/8 |
| 5,902,352 | 5/1999 | Chou et al. ................................ 709/102 |

*Primary Examiner*—Eric W. Stamber
*Assistant Examiner*—Romain Jeanty
*Attorney, Agent, or Firm*—Dorsey & Whitney LLP

[57] ABSTRACT

A system for notifying an individual of a previously scheduled event. The individual's scheduling information is accessed, and analyzed. When a scheduled event arrives, the user is notified in the manner that the user specifies. Methods of notification include wireless pager, email, and wireless telephone.

34 Claims, 11 Drawing Sheets

SYSTEM FOR NOTIFYING AN INDIVIDUAL OF A PREVIOUSLY SCHEDULED EVENT

FIELD OF THE INVENTION

The present invention relates generally to techniques for notifying individuals of scheduling or meeting information. More particularly, the present invention relates to techniques for integrating the use of communication devices and methods with scheduling information.

BACKGROUND OF THE INVENTION

The proliferation of personal computers and portable information devices has provided substantial improvements in the ability to track appointments and communicate with others. For example, many individuals now store information on a personal computer in a way that allows them to track projects, work assignments, and deadlines. And as portable personal computers have become more powerful and inexpensive, scheduling software has become popular and widely used.

At the same time, wireless paging devices, cellular phones, and other portable communication devices are also becoming widely used. These devices allow others to contact or communicate with a person who might otherwise be unavailable. Because communication has become so much easier, people who use modern communications devices are much more free to leave their traditional office environment or home because they know that they can be reached by those who wish to reach them.

While use of the use of scheduling software has become very common, and while the use of new types of communication devices has also become very common, there has been no efficient interaction between the two. Previously, there has been no effective integration of scheduling and communications capabilities, and no way to take advantage of the benefits available if such integration were possible. For example, one possible benefit is that the scheduling system itself can use a communication device to ensure that an individual is aware of important events on his or her schedule. Thus, there exists a need for an efficient system and method for efficiently integrating scheduling software with a variety of communication devices.

SUMMARY OF THE INVENTION

The present invention relates to techniques for notifying an individual of an event scheduled for that individual. In one embodiment of the invention, the invention relates to a system for communicating scheduling information to a user, comprising (a) a network; (b) a client computer that is connected to the network and that executes software that allows the user to perform scheduling tasks; (c) a storage area, accessible by the client computer, for storing the user's scheduling information; (d) a notification server that initiates communication with the user; and (e) a server computer that is connected to the network and the notification server. The server is programmed to: retrieve from the storage area the user's scheduling information, analyze the user's scheduling information and queue events in the scheduling information that are within a specified time frame, access the queued events, and activate the notification server at or about the time that the queued event is to occur to thereby initiate communication with the user and inform the user of the scheduled event when the user is not near the client computer.

In another embodiment of the present invention, the present invention relates to a data storage medium having a program stored on it. The program is configured to cause a computer to: retrieve scheduling information for a user; analyze the user's scheduling information and queue events in the scheduling information that are within a specified time frame by storing them in a queue; access the queue to retrieve one or more queued events; and activate the notification server at or about the time that the queued event is to occur to thereby initiate communication with the user and inform the user of the scheduled event.

Additional embodiments and features, and the nature of the present invention may be more clearly understood by reference to the following detailed description of the invention, the appended claims, and to the several drawings herein.

Additional embodiments and features, and the nature of the present invention may be more clearly understood by reference to the following detailed description of the invention, the appended claims, and to the several drawings herein.

DETAILED DESCRIPTION OF THE INVENTION

Figure 1:
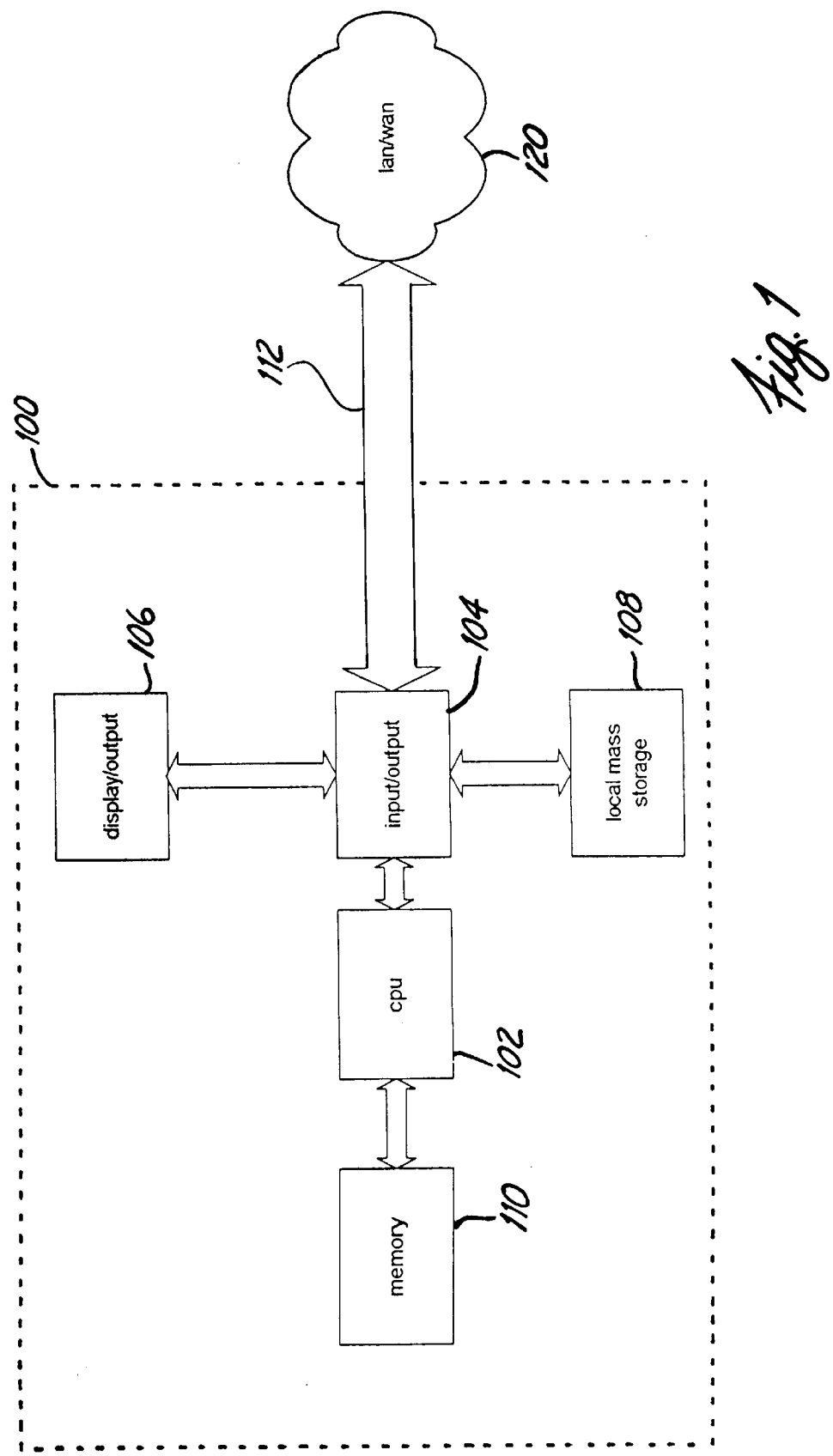
FIG. 1 is a block diagram of a computer system having central processing unit that is connected to a local or wide area network through an input-output module.

FIG. 1 is a block diagram of a computer system 100 having a central processing unit 102, and an input/output module 104. The processor 102 is connected to the memory 110 and the input/output module 104. The module 104 includes circuitry for interfacing the processor 102 with other devices within the computer system 100, including the display or output device 106, and the (optional) local mass storage 108. The module 104 also interfaces the computer 100 to the network 120, which may be a local or wide area network. Typically, the network is a TCP/IP internetwork, but any other network protocol could be used.

Figure 2:
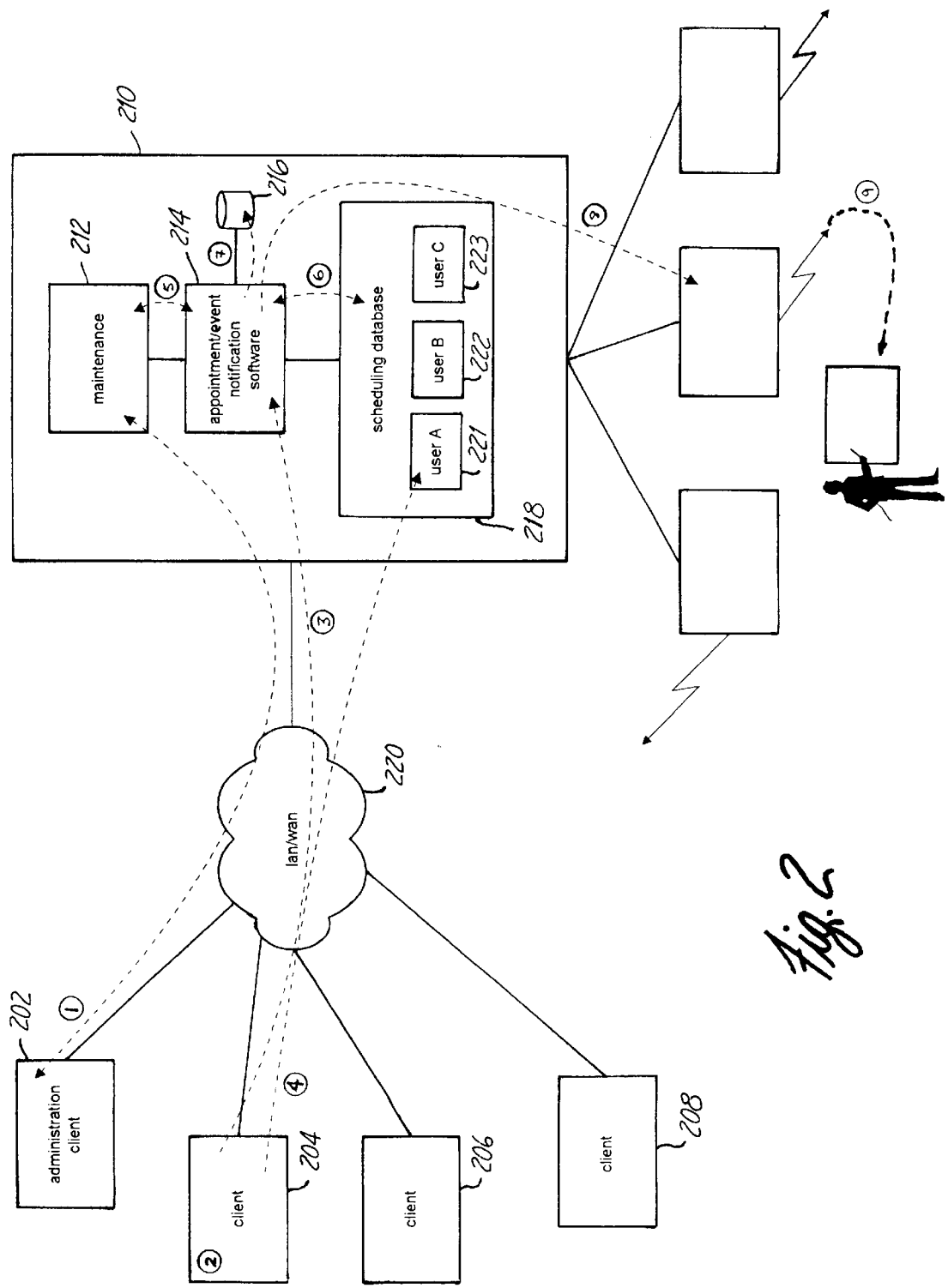
FIG. 2 is a block diagram of a system for notifying an individual of a previously-scheduled event, where the scheduling information is stored at the server.

FIG. 2 shows a block diagram of a system having a number of client computers 202, 204, 206, and 208, which may be of the type illustrated in FIG. 1. Each of these client computers is on a network 220, which may be either a wide area or local area network. Also shown is a computer 210, which may act as a server for some functions associated with the client computers. The computer 210 includes a maintenance module 212, appointment notification software 214, and a queue database 216. Also included within the computer 210 is a scheduling database 218, having scheduling information for at least three different users: A, B, and C. The scheduling information for each of these three users is stored in modules 221, 222, and 223, respectively. It should be understood that one or more of the modules within the computer 210 could be implemented as separate computers. For example the maintenance module 212 and appointment notification software could be implemented on or executing on a separate computer.

Notification servers 232, 234, and 236 are also shown in FIG. 2. Each of these servers provides a way of communicating with individuals, such as the individual represented by numeral 238. These individuals may be in their office (or home), near their office, or far away from their office. The notification servers 232, 234, and 236 have the capability, however, of communicating with individuals wherever they might be. For example, notification server 232 is an email server that is used to communicate via email, which can be sent to the user's normal desktop computer, or to another computer at which the user may be working. This notification server 232 may be connected back into the network 220 so that the email messages may be delivered through the network.

Notification server 234 is a wireless telephone server that is capable of initiating cellular or other wireless audio communication to a given telephone number. Normally, the user 238 carries with him or her a portable telephone. Notification server 236 is a wireless messenging server or wireless paging server that is used to send, through a wireless mechanism, messages and/or other information. As is well known in the art, individuals wear a paging receiver, and are notified when a message has been sent.

In some embodiments, the notification servers are not integrated with the computer 210, and the notification software 214 is not integrated with any of the software controlling the notification servers. In these situations, computer 210 communicates with the notification servers 232, 234, and 236 through an interprocess communication mechanism. Such a mechanism may be a custom application programming interface made available by the notification servers 232, 234, and 236 to other programs, such as the notification software 214. Such a mechanism could also involve the use of a component technology, such as Microsoft's ActiveX and/or OLE (formerly Object Linking and Embedding) technologies based on the Component Object Model and Distributed COM (formerly Network OLE) architectures, Object Management Group's CORBA technologies (e.g., Internet Inter-Object Protocol (IIOP)), JavaBeans component technology, or Remote Method Invocation technology available in a Java environment. It should be understood, however, that any other method or system for interprocess communication now known or hereinafter developed may be appropriate for use in practicing the invention.

In the system of FIG. 2, a system administrator will typically perform system administration tasks, using administration software executing at the administration client 202. Users A, B, and C perform scheduling tasks using scheduling software executing at the client computers, 204, 206, and 208, respectively. In the embodiment of FIG. 2, the database of appointments, deadlines, and other information for users A, B, and C is stored at the server computer 210 within the scheduling database 218. The client computers 204, 206, and 208 used by these users may be desktop machines located in their offices, or these computers may be these users' regularly-used mobile computers. Users A, B, and C may often be away from their computer, however, so they may be unable to use the computer to check on scheduling information and watch for upcoming events. The system of FIG. 2 is designed to permit effective use of previously scheduled information in such a situation.

The appointment notification software 214 executes on the computer 210. This software retrieves information from the scheduling database 218, and then interacts with the notification servers 232, 234, and 236 to notify one of the users A, B, and C of upcoming events on their schedules. The notification software 214 may access data in the scheduling database through a customized query protocol. The data may also be accessible through a known query protocol, such as through the Structured Query Language and/or the Open Database Connectivity (ODBC) standard. The data may also be stored in a format that permits retrieval through an interprocess communication mechanism, such as an ActiveX/OLE interface, DDE, through a custom API which may be implemented through a dynamic link library, or through any of the other mechanisms previously mentioned. Similarly, other communication that the notification software carries out with other modules or devices, such as the maintenance module 212 or one of the notification servers 232, 234, and 236, are through an interprocess communication mechanism, a directory protocol, through a data retrieval protocol, or through some other mechanism.

Figure 3:
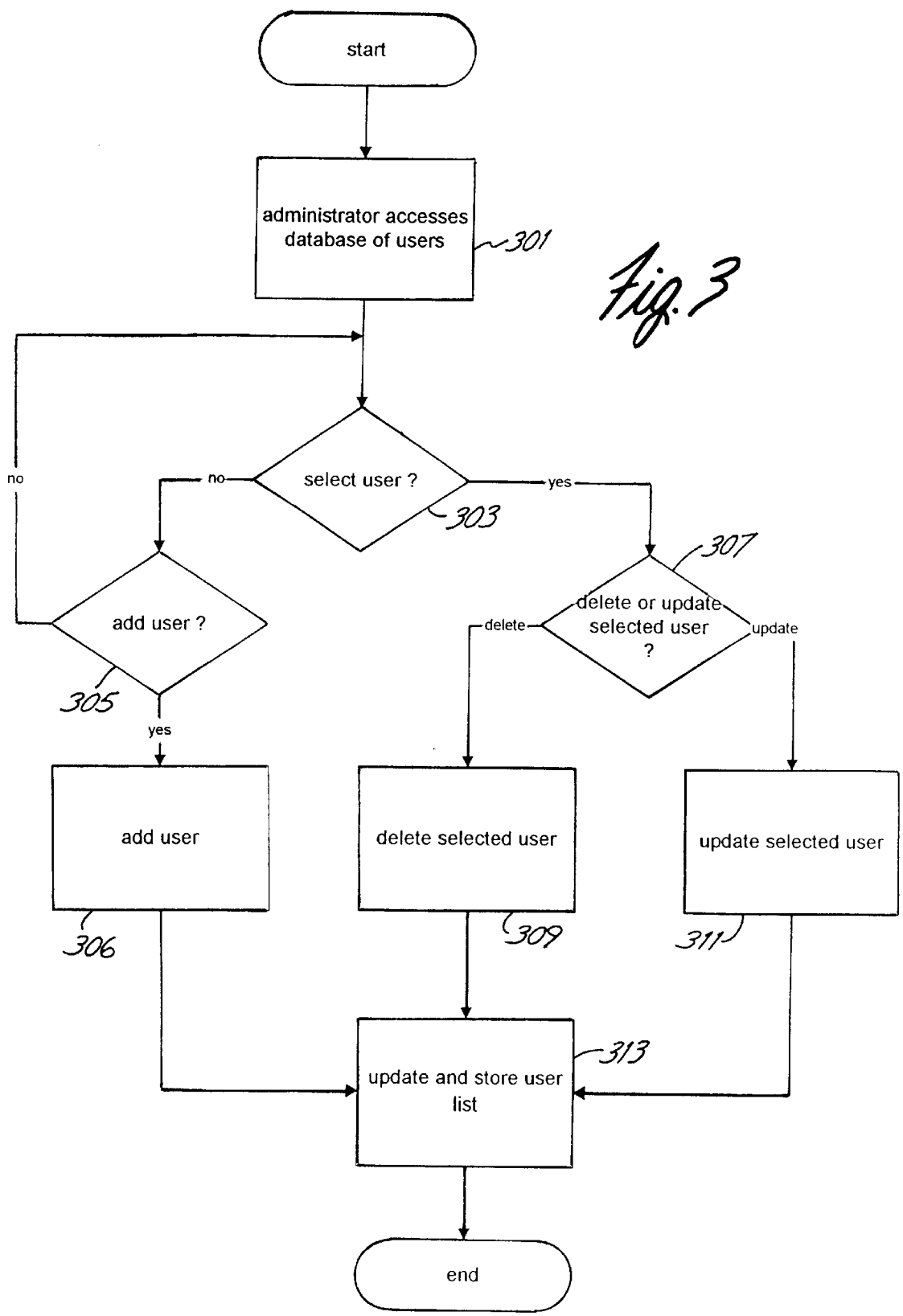
FIG. 3 is a flow chart of the operation of a program used by an administrator of the system.

FIG. 3 is a flow chart illustrating the operation of an administration program that executes at client computer 202 in FIG. 2. The administration program is used by a system administrator to add, delete, and modify the list of people that use the appointment notification software. The program may also modify the attributes of a particular individual's entry, such as that individual's cellular telephone number, email address, wireless pager number, or other information. As shown at 301 in FIG. 3, the administration software accesses the database of users, which may be stored locally, or at another location on the network, as shown at 212 in FIG. 2. At 303, if the administrator has selected a user, the administrator can update at 311 or delete at 309 the selected user. Otherwise, the administrator is given the option to add a user to the system at 305. Once the desired task has been performed, the maintenance database is updated and stored. In FIG. 2, the database 212 is maintained at computer 210.

Figure 4:
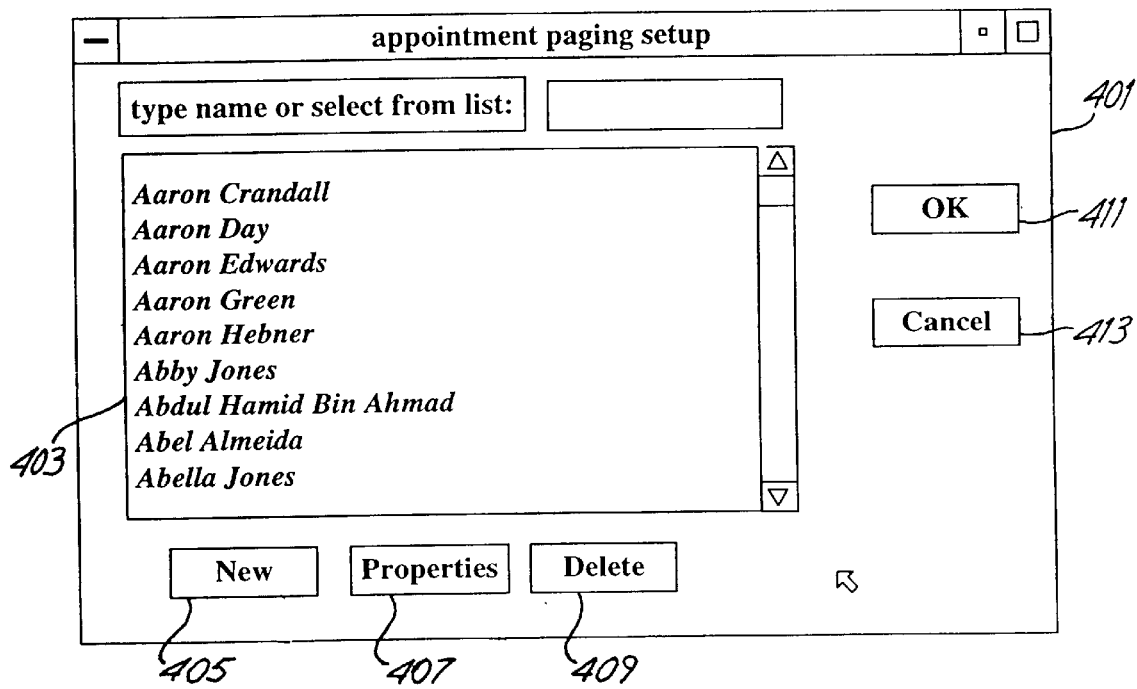
FIG. 4 is a representation of a window associated with an administration program shown on a screen display.

FIG. 4 is a representation of a window 401 taken from a screen display that might be seen by the administrator when operating the administration program executing on the client computer 202. The current list of users is shown in box 403. The administrator scrolls through the list of users, and selects a user. The administrator then selects either the properties button 407 or the delete button 409. Selection of the properties button 407 permits the user to modify the attributes of the selected user. Selection of the delete button 409 removes the selected user from the list, and thus also removes the user's ability to use the system to notify him or her of scheduled events. A new user can be added to the list by selecting the new button 405. When the administrative tasks are complete, the administrator closes the window 401 by selecting either the OK button 411 to save the changes, or the Cancel 413 button to discard any changes.

Figure 5:
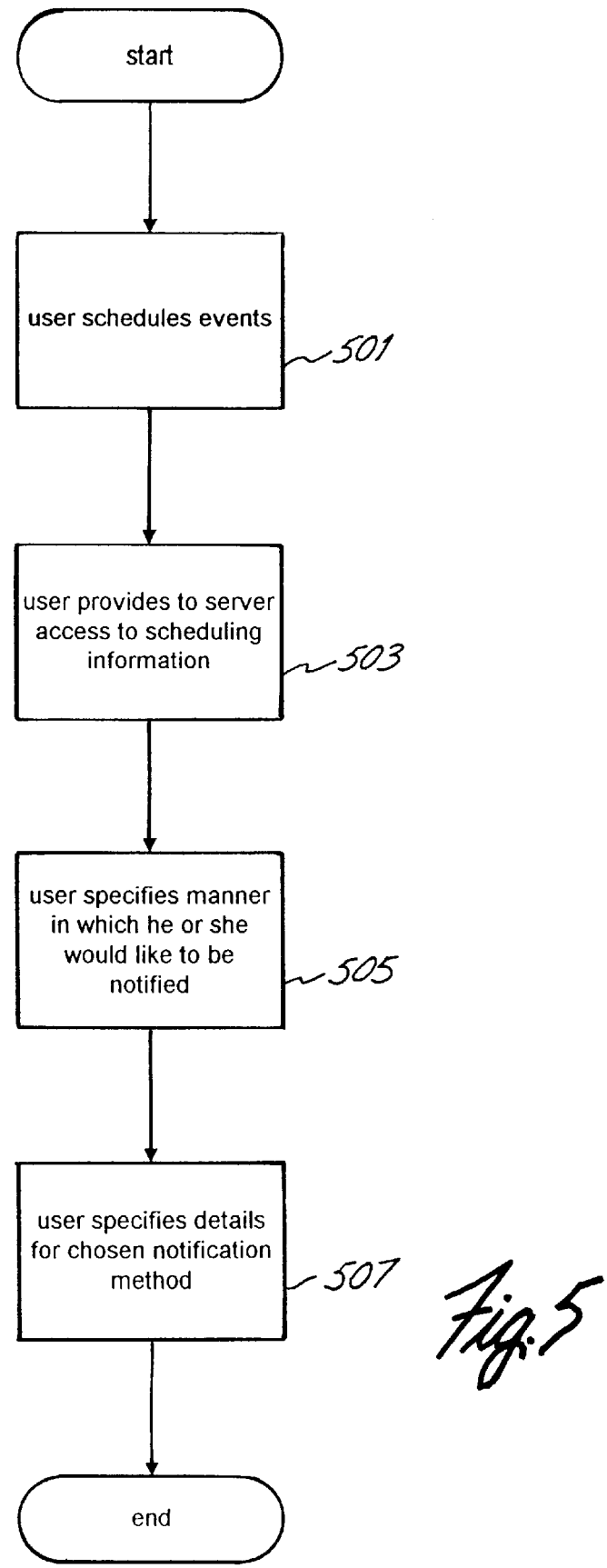
FIG. 5 is a flow chart illustrating the operation of a program that allows a scheduling entry for a given event to be configured for later notification.
Figure 6:
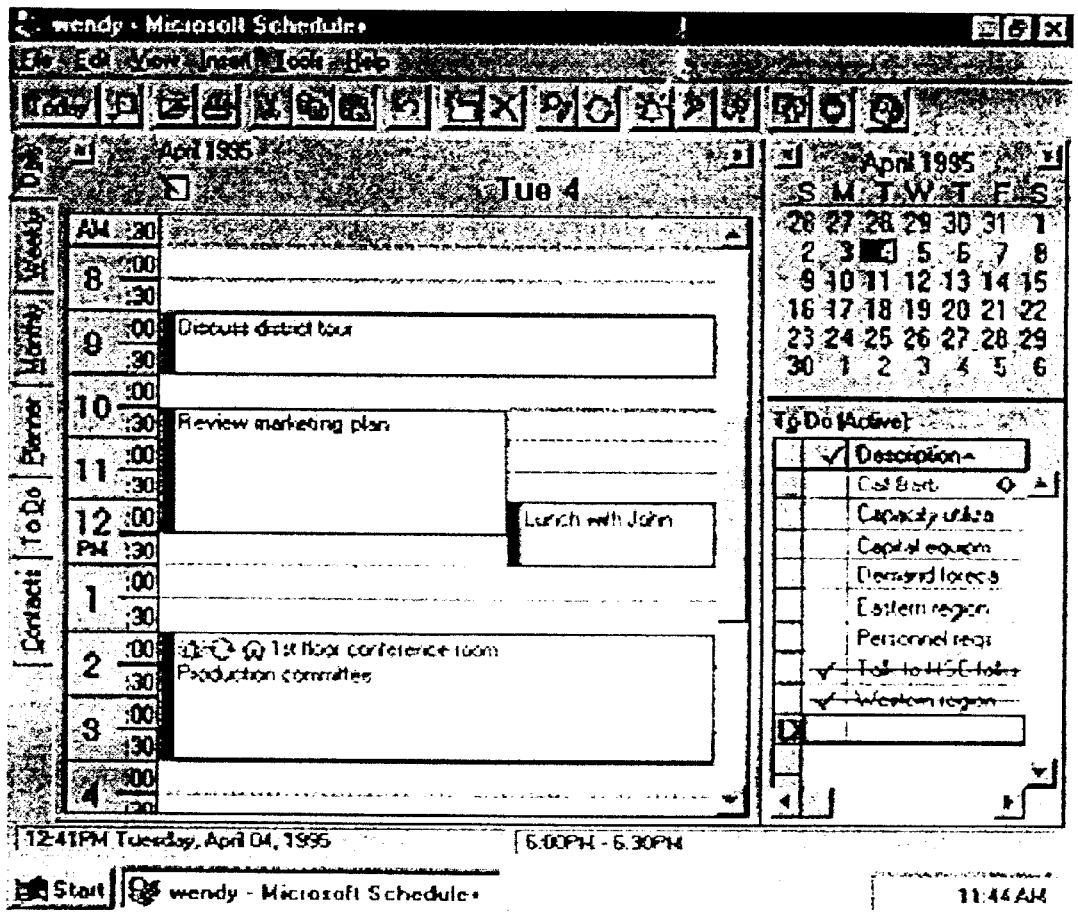
FIG. 6 is a representation of a window on a screen display, where the window is associated with a scheduling program executing at the client computer.

FIG. 5 is a flow chart illustrating the operation of the scheduling software, such as that used by users A, B, and C in FIG. 2. Most often, this software executes on the client computer, but in the embodiment of FIG. 2, the scheduling information is stored on the server 210. At 501 in FIG. 5, the user interacts with the scheduling software, and schedules appointments, deadlines, and other events of interest. FIG. 6 is a representation of a screen display of such a program, showing scheduling or appointment data for Tuesday, April 4. The scheduling software shown in the Figure is Microsoft Schedule+, which is a scheduling program that may be used with the present invention.

At 503 in FIG. 5, the user provides access to his or her scheduling information to the appointment notification software executing on the server 210. This is necessary to allow the appointment notification software to read at least some of the entries in that person's schedule, and thus notify that person as the time for the event approaches. Access can be provided by sending a command to the notification software, by configuring the scheduling software so that other programs can access it, or by using a password scheme. In another embodiment, the administrator may regulate the access to each user's scheduling information.

Figure 7:
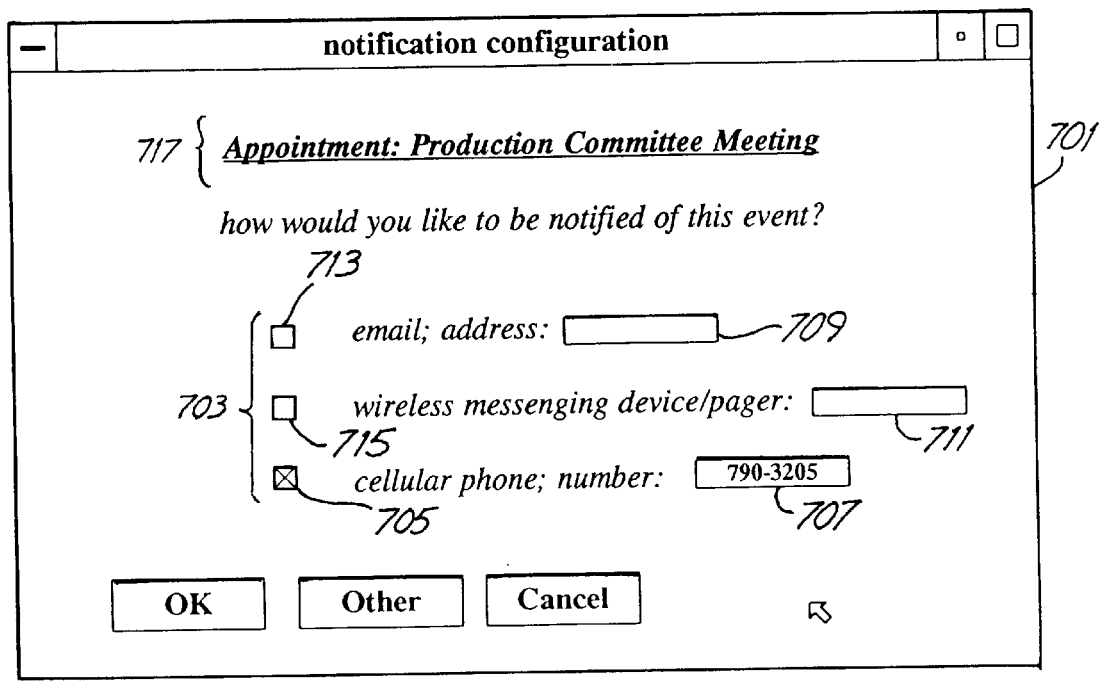
FIG. 7 is a representation of another window associated with a scheduling program executing at the client computer, where the window allows the user to configure the manner in which he or she is notified for the scheduled event.

At 505 and 507 in FIG. 5, the user configures how he or she wishes to be notified for a particular appointment. For example, FIG. 7 is a representation of a window 701 that may be associated with the scheduling program shown in FIG. 6. As shown in FIG. 7, by selecting one (or more) of the boxes 703, the user can select the manner in which he or she is notified of the event or appointment 717 identified at the top of the window 701. In FIG. 7, the user has selected box 705, which specifies that the user is to be notified of the "production committee meeting" by cellular telephone. The user also specifies the desired telephone number in box 707. Boxes 713 and 715 relate to other methods (email and wireless messenging device or pager) of notifying the user as the specified appointment approaches. Boxes 709 and 711 also allow the user to specify an email address or pager number/identifier associated with those methods.

Although the configuration options shown in FIG. 7 are for a particular appointment, it should be understood that similar configuration settings may be available on a global basis, so that all appointments in a given schedule have a default notification configuration. A window such as that shown in FIG. 7 may be used to alter the default configuration for a particular appointment or notification. It should also be understood that other methods for configuring a particular notification or groups of notifications may be employed. Further, it should be understood that other methods for notifying users of events, beyond those shown in FIG. 7, could be employed.

Figure 8:
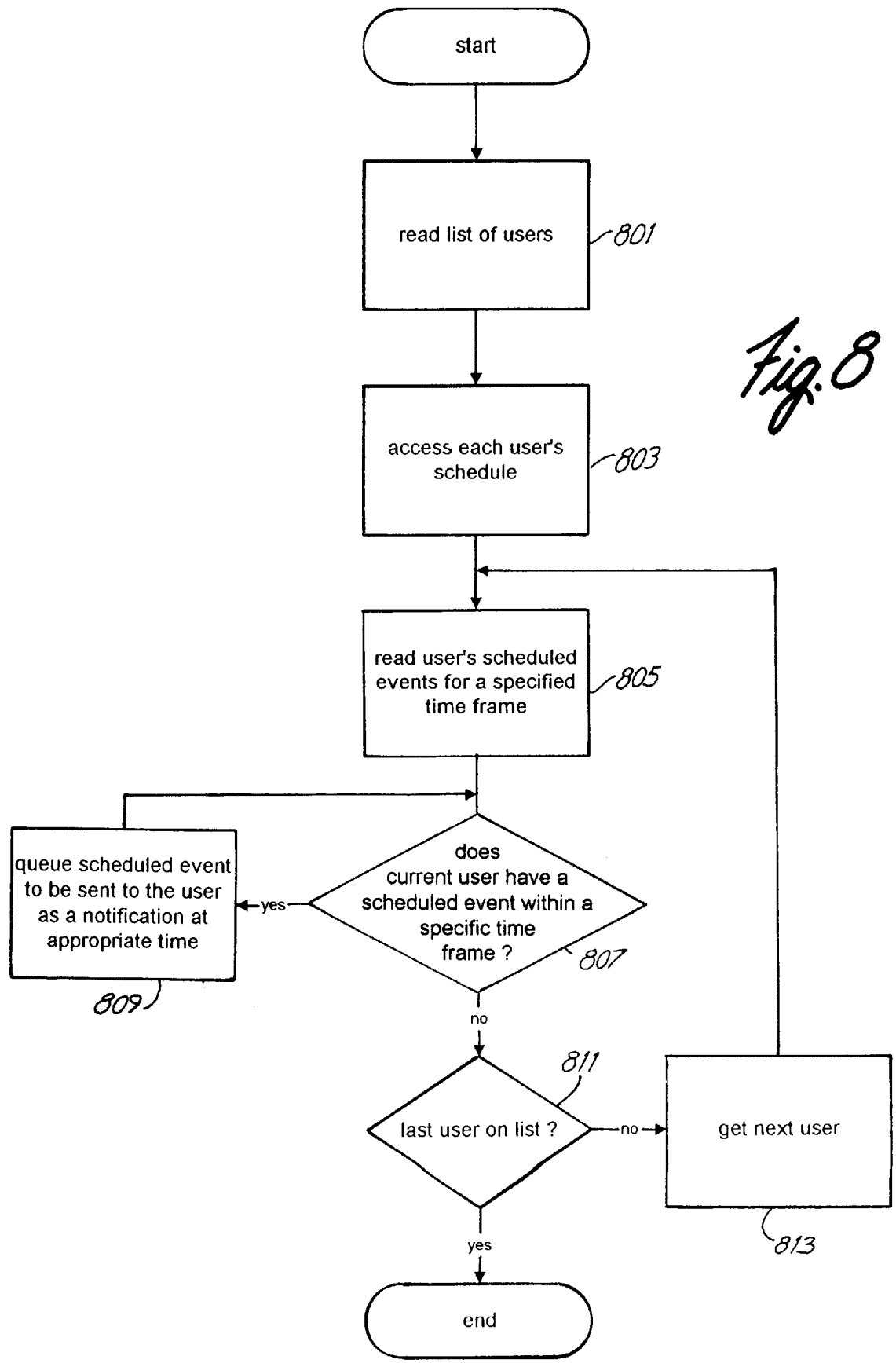
FIG. 8 is a flow chart illustrating the operation of an operation carried out by the notification software.

FIG. 8 is a flow chart of an operation carried out by the notification software 214 executing on server 210 in FIG. 2. At 801 in FIG. 8, the notification software represented by 214 in FIG. 2 accesses the list of users from the maintenance module 212. This access will typically involve simply reading the file or directory of users maintained by the administrator. In some embodiments, this access may involve use of directory protocols, e.g., LDAP or NDS, or the use of a database query language. Thereafter, at 803 and 805 in FIG. 8, the notification software 214 accesses each user's scheduling information stored in the database 218, and reads the scheduled events in each user's schedule for a specified time frame. The specified time frame will typically be a period of time starting at the present and extending into the future. Such a period may be, for example, a period of eight hours starting from the present time. This allows the notification software 214 to analyze the scheduling information for all approaching events, and prepare to notify the user of these events. In some embodiments, scheduling information that is well into the future may not be retrieved or read from the database 218 because users often are not interested in being notified of events until the scheduled time is near. It should be understood, however, that in other embodiments, various applications of the invention and other considerations may make a different time frame (or time frames) more appropriate.

If at 807 an analysis of the scheduling information indicates that the user has an event scheduled for the specified time frame, and if the user wishes to be notified of the event, the scheduled event or events are queued at 809 to be sent to the user as a notification at the appropriate time. This process repeats until the scheduling information for the last user on the list has been analyzed at 811.

Figure 9:
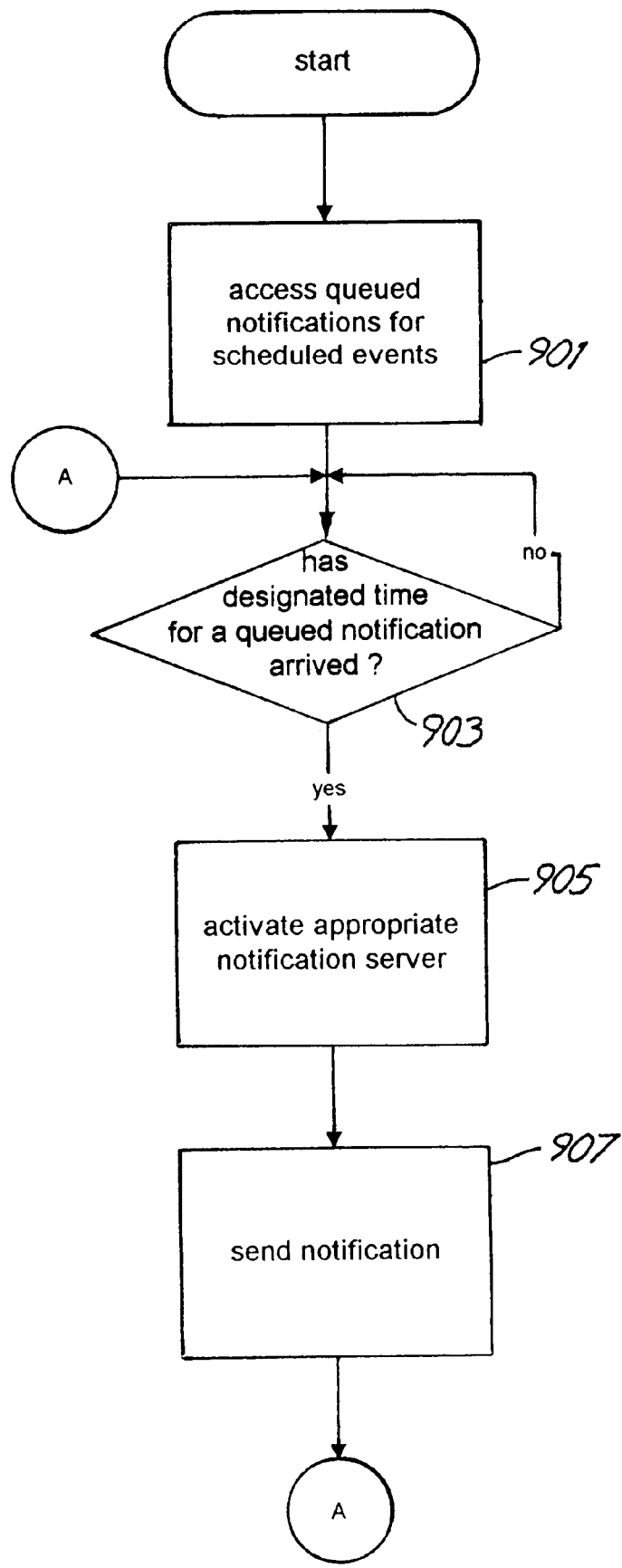
FIG. 9 is a flow chart illustrating the operation of another operation carried out by the notification software.

FIG. 9 is a flow chart of another operation carried out by the notification software 214 executing on the server 210 in FIG. 2. At 901, the notification software 214 accesses the queued notifications for scheduled events that were queued at 809 in FIG. 8. Once the queued operations are accessed, the notification software waits until a designated time for a queued notification arrives. This designated time may be at the time of the scheduled event, but it is preferred that the designated time be some small period of time before the event so that the user has a better opportunity to prepare for the event or get to the event at the scheduled time. The amount of this lead time can be configured globally, or configured by each individual user, and perhaps for each individual event.

Once a designated time for a queued notification arrives, the notification software 214 activates the appropriate notification server at 905. For example, if the notification entry for the event is configured so that the user is notified by wireless telephone, the notification software sends a command to the notification server 234, or otherwise causes that notification server 234 to place a telephone call to the user at 907.

Figure 10:
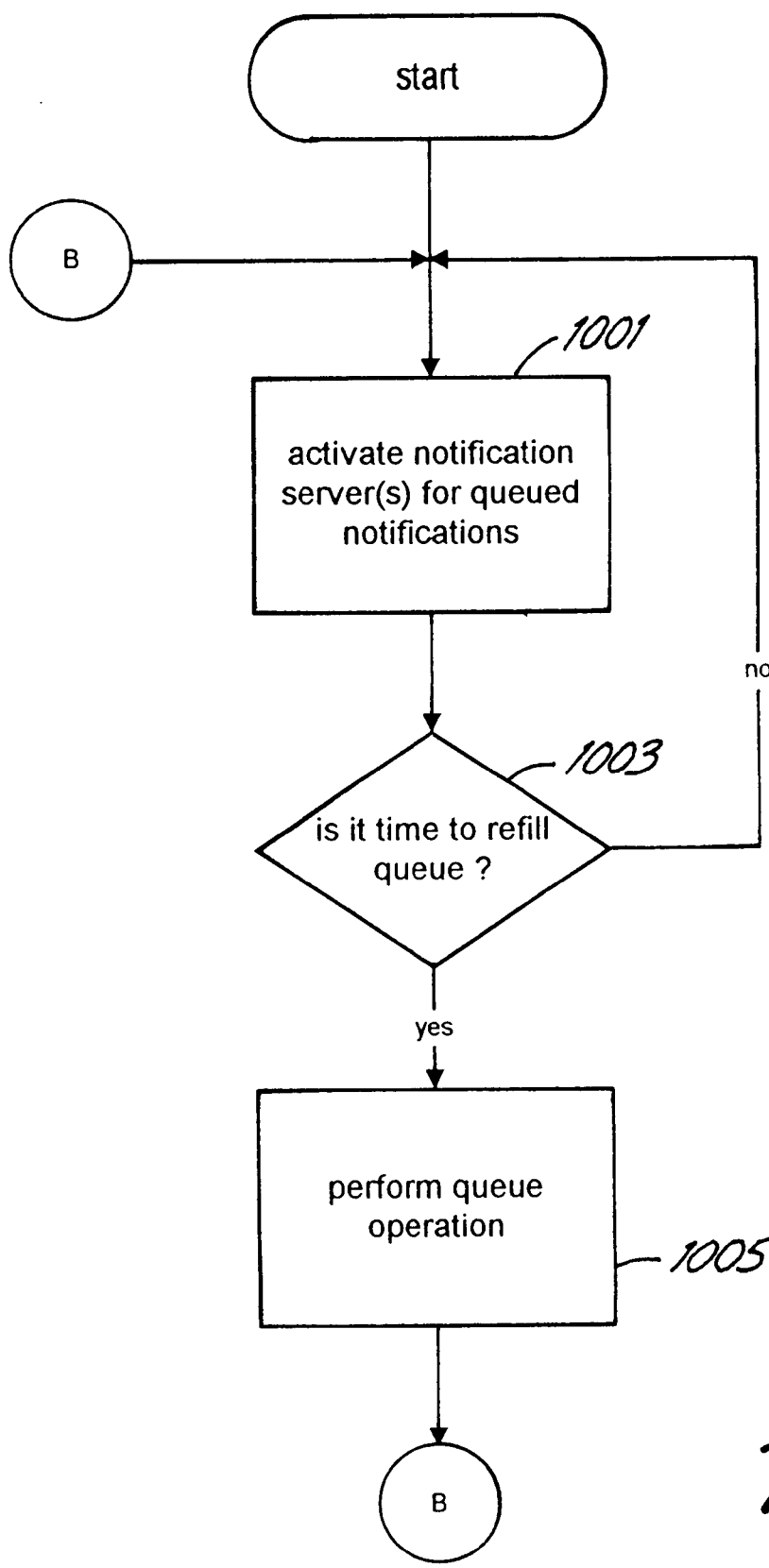
FIG. 10 is a flow chart illustrating the operation of the notification software.

Thus, as described in FIG. 8, the notification software periodically reads scheduling information from the scheduling database, and queues events scheduled for the near future to be sent to a notification server at an appropriate time. And as described in FIG. 9, once the designated time for one of these queued events arrives, the appropriate notification server is activated, and the notification is sent. FIG. 10 illustrates these processes in one embodiment of the present invention. At 1001, and at the appropriate times, the notification software activates the appropriate notification server for the (previously) queued notifications. At 1003, the notification software determines whether the appropriate time to refill the queue has arrived. If so, the queue is refilled at 1005, and the notification software goes back to activating the notification server(s).

Referring again to FIG. 2, the operation of the previously-described embodiment of the invention is illustrated. As described in FIG. 3, the administrator performs administration tasks at the client computer 202, accessing the maintenance database or module 212. Once the desired user profiles are updated or otherwise modified, the new user list and associated information is stored in the maintenance database or module 212. This operation is represented in FIG. 2 by the broken arrow labeled "1" in FIG. 2.

User A regularly works with client computer 204 in carrying out day to day scheduling tasks. See "2" in FIG. 2. The other users, B and C, regularly work with computers 206 and 208. Each user also provides read access to the notification software, so that the notification software can read that user's schedule from scheduling database. In the embodiment shown, this access is provided by configuring the maintenance database. Although this is a task that could be performed by the administrator, it is shown in FIG. 2 (for user A) as being carried out by the user at the client computer. See "3" in FIG. 2. And in connection with performing scheduling tasks, each user specifies details about the chosen notification method for that user's appointments, and this information is stored in the scheduling database 218. See "4" in FIG. 2.

The notification software periodically reads the list of users from the maintenance module 212 and accesses each user's scheduling information from the scheduling database 218. See "5" and "6" in FIG. 2. As scheduled events for a given user (e.g., user A) approach, they are queued by the notification software 214 for later delivery to one of the notification servers. See "7" in FIG. 2. And once the designated time for a specific event arrives, the notification software 214 activates the desired notification server, and user A (designated by 238), who may be in the field, traveling, or otherwise away from his or her normal office, is notified of the upcoming event. See "8" and "9" in FIG. 2. In the embodiment shown, the notification server 234 is used to notify user A. This notification server is hardware that dials user A's wireless telephone number, and plays an audio message. Such a message may be an audio rendition (i.e., reading) of the information associated with the user's scheduled event, or it could be any other useful message that notifies user A that the time for a previously scheduled event has arrived.

Figure 11:
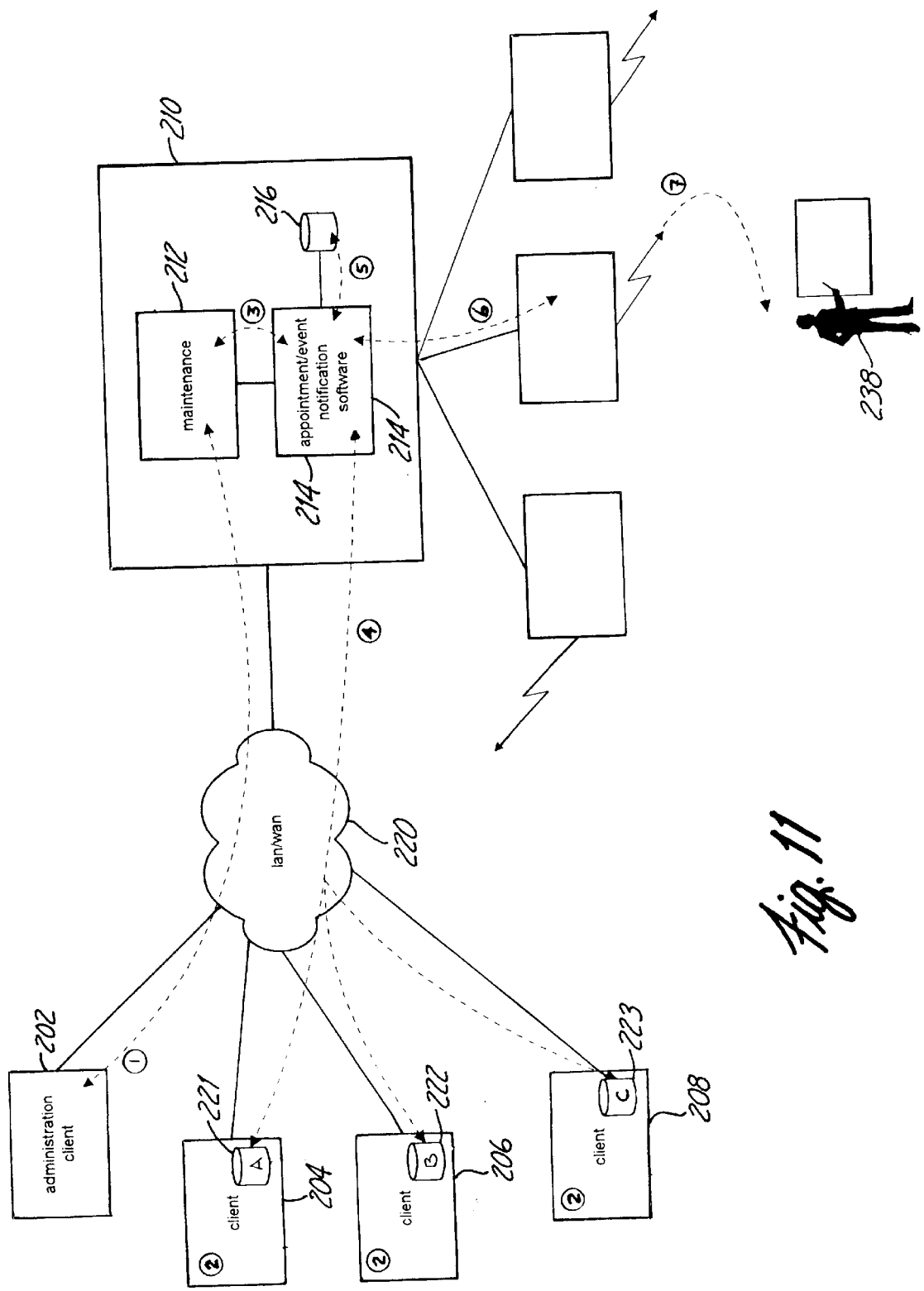
FIG. 11 is a block diagram of a system for notifying an individual of a previously-scheduled event, where the scheduling information is stored at each individual's client computer.

FIG. 11 is a diagram of a system in an alternate embodiment of the present invention. In FIG. 11, the scheduling information is stored at the client computer for each user, rather than at the server as in FIG. 2. For example, since computer 204 is typically used by user A, the scheduling information for user A is stored on storage device 221 within computer 204 in FIG. 11. Similarly, the scheduling information for users B and C are stored at computers 206 and 208, respectively.

The operation of this alternate embodiment of the present invention is illustrated in FIG. 11. As was the case with FIG. 2, the administrator performs administration tasks at the client computer 202, accessing the maintenance database or module 212, and storing the new user list and associated information in the maintenance module 212 at the server 210. See "1" in FIG. 11.

Users A, B, and C carry out scheduling operations at the client computers 204, 206, and 208, while also providing the specifics about how to be notified for any scheduled appointments or events. In addition, each user also provides read access to the notification software, so that the notification software can read that user's schedule from scheduling database. In the embodiment of FIG. 11, this is done by configuring the scheduling program at the client computer to provide read access to the scheduling data stored at the client. See "2" in FIG. 11.

The notification software periodically reads the list of users at the server 210 from the maintenance module 212. See "3" in FIG. 11. The notification software then accesses, over the network, each user's scheduling information. See "4" in FIG. 11. This access can be carried out through a customized interface or API, perhaps available remotely through a Dynamic Link Library, COM, ActiveX/OLE, and/or DCOM interface on the Windows platform. In other embodiments, this access could be through a protocol such as IIOP, through Java-related technologies (e.g., JavaBeans or Java RMI calls), or even a through high-level Internet protocol such as HTTP. However, it should be understood any method or system for network communication now known or hereinafter developed may be appropriate for use in practicing the invention.

As scheduled events for a given user approach, they are queued by the notification software 214 for later delivery to the notification server. See "5" in FIG. 11. And once the designated time for a specific event arrives, the notification software 214 activates the desired notification server. See "6" in FIG. 11. This activation causes the user A (238) to be notified of the upcoming event.

See "7" in FIG. 11.

As will be appreciated by one skilled in the art, the manner in which the maintenance module, scheduling information or scheduling database is stored or distributed on a network can be changed without departing from the spirit of the invention. Further, although the present invention has been described in terms of certain embodiments, various changes and modifications, even if not shown or specifically described herein, are deemed to lie within the spirit and scope of the invention and the appended claims. Accordingly, it is the appended claims, and not the foregoing illustrations and descriptions that define the scope of the invention.

What is claimed is:

1. A system for communicating scheduling information to a user about a scheduled event, comprising:
   (a) a network;
   (b) a client computer that is connected to the network and that executes software that allows the user to perform scheduling tasks,
   (c) a storage area, accessible by the client computer, for storing the user's scheduling information;
   (d) a notification server that initiates communication with the user;
   (e) a server computer that is connected to the network and the notification server, wherein the server computer is programmed to:
      retrieve from the storage area the user's scheduling information, wherein the user's scheduling information includes the manner in which the user is to be notified of the scheduled event and the time at which the user is to be notified of the scheduled event,
      analyze the user's scheduling information and queue events in the scheduling information that are within a specified time frame,
      access the queued events, and
      activate the notification server at or about the time that the queued event is to occur to thereby initiate communication with the user about the scheduled event in the manner in and time at which the user is to be notified of the scheduled event, thereby informing the user of the scheduled event when the user is not near the client computer.

2. The system of claim 1, wherein the storage area is located at the client computer.

3. The system of claim 1, wherein the storage area is located within the server computer.

4. The system of claim 1, wherein the information about the manner in which the user is to be notified of the scheduled event applies to a subset of all events in the user's scheduling information.

5. The system of claim 4, wherein the specified time frame includes a time frame beginning at the time the server retrieves from the storage area the user's scheduling information, and ending within twenty-four hours after such time.

6. The system of claim 5, wherein the notification server places a wireless telephone call to the user.

7. The system of claim 5, wherein the notification server sends a message by wireless pager to the user.

8. The system of claim 5, wherein the server is further programmed to:

activate a second notification server if the user has not been successfully informed of the scheduled event, wherein the second notification initiates communication with the user to inform the user of the scheduled event.

9. The system of claim 8, further comprising:

(f) an administration client computer that is connected to the network and that carries out user administration tasks.

10. The system of claim 9, wherein the administration client computer regulates access to the user's scheduling information.

11. A computer that is connected to at least one notification server that is capable of communicating with a user, wherein the computer has access to scheduling information about a scheduled event for the user, the computer comprising:

(a) a processor;

(b) a queue that is accessible to the processor for storing queued events;

(c) a network connection that is accessible to the processor; and (d) a program storage area accessible to the processor and having a program stored thereon, wherein the program is configured to cause the processor to:

retrieve the user's scheduling information, wherein the scheduling information includes the manner in which the user is to be notified of the scheduled event and the time at which the user is to be notified of the scheduled event;

analyze the user's scheduling information and queue events in the scheduling information that are within a specified time frame by storing them in the queue, access the queue to retrieve one or more queued events, and activate the notification server at or about the time that the queued event is to occur to thereby initiate communication with the user about the scheduled event in the manner in and time at which the user is to be notified of the scheduled event, thereby informing the user of the scheduled event.

12. The computer of claim 11, wherein the notification server places a wireless telephone call to the user.

13. The computer of claim 11, wherein the notification server sends a message by wireless pager to the user.

14. The computer of claim 11, wherein the program is further configured to cause the processor to:

activate a second notification server if the user has not been successfully informed of the scheduled event, wherein the second notification server initiates communication with the user to inform the user of the scheduled event.

15. The computer of claim 14, wherein the scheduling information is retrieved from a remote location on the network.

16. The computer of claim 14, wherein the scheduling information is retrieved from a location within the computer.

17. The computer of claim 14, wherein the information about the manner in which the user is to be notified of the scheduled event applies to a subset of all events in the user's scheduling information.

18. The computer of claim 17, wherein the specified time frame includes a time frame beginning at the time the computer retrieves the user's scheduling information, and ending within eight hours after such time.

19. The computer of claim 18, wherein the program is further configured to cause the processor to:

retrieve a list of users from a maintenance module, wherein the maintenance module is periodically updated by an administrator.

20. A data storage medium having a program stored on it, wherein the program is configured to cause a computer to:

retrieve scheduling information for a user, wherein the scheduling information includes the manner in which the user is to be notified of the scheduled event and the time at which the user is to be notified of the scheduled event;

analyze the user's scheduling information and queue events in the scheduling information that are within a specified time frame by storing them in a queue;

access the queue to retrieve one or more queued events; and activate a notification server at or about the time that the queued event is to occur to thereby initiate communication with the user about the scheduled event in the manner in and time at which the user is to be notified of the scheduled event, thereby informing the user of the scheduled event.

21. The data storage medium of claim 20, wherein the program is further configured to cause a computer to:

activate a second notification server if the user has not been successfully informed of the scheduled event, wherein the second notification initiates communication with the user to inform the user of the scheduled event.

22. The data storage medium of claim 21, wherein the program is further configured to cause a computer to retrieve the scheduling information from a remote location on a network.

23. The data storage medium of claim 21, wherein the program is further configured to cause a computer to retrieve the scheduling information from a location within the computer.

24. The data storage medium of claim 21, wherein the program is further configured to cause a computer to analyze the scheduling information to determine information about how the user is to be notified.

25. The data storage medium of claim 24, wherein the specified time frame includes a time frame beginning at the time the computer retrieves the user's scheduling information, and ending within forty-eight hours after such time.

26. The data storage medium of claim 25, wherein the program is further configured to cause a computer to:

retrieve a list of users from a maintenance module, wherein the maintenance module is periodically updated by an administrator.

27. A computer that is connected to at least one notification server that is capable of communicating with a user, the computer comprising:

means for retrieving a user's scheduling information, wherein the scheduling information includes the manner in which the user is to be notified of the scheduled event and the time at which the user is to be notified of the scheduled event;

means for analyzing the user's scheduling information;

means for queuing events in the scheduling information that are within a specified time frame by storing them in a queue;

means for accessing the queue to retrieve one or more queued events; and means for activating the notification server at or about the time that the queued event is to occur to thereby initiate communication with the user about the scheduled event in the manner in and time at which the user is to be notified of the scheduled event, thereby informing the user of the scheduled event.

28. The computer of claim 27, wherein the means for activating the notification server includes means for placing a wireless telephone call to the user.

29. The computer of claim 27, wherein the means for activating the notification server includes means for sending a message by wireless pager to the user.

30. The computer of claim 27, wherein the means for activating the notification server includes means for sending an email message to the user.

31. The computer of claim 27, further comprising:

means for activating a second notification server if the user has not been successfully informed of the scheduled event, wherein the second notification initiates communication with the user to inform the user of the scheduled event.

32. The computer of claim 31, wherein the means for retrieving the user's scheduling information includes means for retrieving scheduling information from a remote location on the network.

33. The computer of claim 31, wherein the means for retrieving the user's scheduling information includes means for retrieving scheduling information from a location within the computer.

34. The computer of claim 31, further comprising:

means for retrieving a list of users from a maintenance module, wherein the maintenance module is periodically updated by an administrator.

\* \* \* \* \*